United States Patent [19]

Goymour

[11] 4,302,824
[45] Nov. 24, 1981

[54] SEISMIC SURVEY APPARATUS

[76] Inventor: Philip C. Goymour, 1 Gullivers Close, Horley, Banbury, Oxfordshire OX15 6DY, England

[21] Appl. No.: 143,739

[22] Filed: Apr. 25, 1980

[30] Foreign Application Priority Data

Feb. 1, 1980 [GB] United Kingdom ............ 455/80

[51] Int. Cl.³ .......................... G01V 1/36; G01V 1/38
[52] U.S. Cl. ...................................... 367/19; 367/12; 367/106; 367/130
[58] Field of Search ................... 367/106, 19, 12, 130; 114/244; 181/110

[56] References Cited

U.S. PATENT DOCUMENTS

| 3,351,895 | 11/1967 | Cuff et al. | 367/106 |
| 3,546,698 | 12/1970 | Kaltschmidt | 367/12 |
| 4,104,608 | 8/1978 | Melling et al. | 367/12 |
| 4,210,897 | 7/1980 | Hutching | 181/110 |
| 4,222,266 | 9/1980 | Theodorelan | 367/130 |
| 4,223,556 | 9/1980 | Hutchins | 367/130 |

FOREIGN PATENT DOCUMENTS 2040313 8/1970 Fed. Rep. of Germany ........ 367/15

OTHER PUBLICATIONS

"Shallow Sub-Bottom Profiling For Offshore Operations", 3/76, p. 10, Research Disclosure, 14317, 367/19, #143.
Geoscience Canada, Hutchins, "A Deep Tow High Resolution Seismic System . . .", 5/76, pp. 95-100, vol. 3, #2.
"Hydrosande Deep Towed Seismic System", 1976, p. 4, Hurtec (70) Ltd. ad Brochure.

Primary Examiner—Nelson Moskowitz
Attorney, Agent, or Firm—Bucknam and Archer

[57] ABSTRACT

A seismic survey apparatus comprises circuit arrangements for providing a train of first signals each corresponding to a sound wave transmitted towards the sea bed, and circuit arrangements for providing associated trains of second signals each corresponding to sound waves reflected from the sea bed. Signal storage means are provided for storing the trains of associated second signals. A filter is provided for deriving from the first and associated second signals a control signal indicative of the apparent vertical movement of the surface of the sea bed due to wave motion or swell. The read out from the signal storage means is then controlled in accordance with the control signal to compensate for the apparent vertical movement of the sea bed due to wave motion or swell. Preferably the read out from the signal storage means is controlled by delaying or advancing the read out of the second signal in accordance with the control signal.

12 Claims, 9 Drawing Figures

SEISMIC SURVEY APPARATUS

TECHNICAL FIELD OF THE INVENTION

This invention relates to seismic survey apparatus such as is used to carry out seismic surveys of the sea bed. In such seismic survey apparatus sound waves are transmitted by a suitable electro-mechanical transducer usually located at or near to the surface of the sea, are reflected by the various layers forming the sea bed and the reflected sound waves are received by a further electro-mechanical transducer, also usually located at or near to the sea surface. Output signals from the two transducers are usually recorded so that the time which elapses between the transmission of the original sound wave and the receipt of reflected sound waves provides a representation of the depth and/or configuration of the geological strata which constitutes the sea bed.

BACKGROUND ART

With seismic survey apparatus as proposed hitherto the transmitting and receiving transducers are either fixed to opposite sides of a marine vessel or are incorporated in small floating units or in a common housing or separate housings located below the sea surface and towed by a marine vessel. A visual recording is made by a pen or stylus arranged to respond to output signals produced by the two transducers. The pen or stylus may be operated from the electrical or mechanical outputs of the transducers directly, or the electrical or mechanical outputs of the transducers may be recorded and the pen or stylus operated by "playing back" the recording.

Since such seismic survey apparatus is dependent on the time which elapses between the transmission of the original sound wave and the receipt of the reflected sound waves it is important that the two transducers are vertically stable and therefore, they can only be operated successfully in extremely calm water, i.e. a wave motion or swell of less than half a meter. If the wave motion or swell is more than one meter the value of the recording may be seriously reduced and when the wave motion or swell is two or three meters the recording may be of little value. Therefore, it will be appreciated that with even normal weather conditions in and around coastal waters, it is not possible to use such known seismic survey apparatus for a considerable part of the time.

An object of this invention is to provide seismic survey apparatus which reduces the above-mentioned difficulty.

DISCLOSURE OF THE INVENTION

According to the present invention seismic survey apparatus comprises means for providing a train of first signals each indicative of the time that a sound wave is transmitted towards the sea bed, means for providing associated trains of second signals each indicative of the time that a sound wave reflected from the sea bed is received, signal storage means for storing the trains of second signals, means for deriving from the first and associated second signals a control signal indicative of the apparent vertical movement of the surface of the sea bed due to wave motion or swell, and means for controlling a read out from the storage means in accordance with the control signal to compensate for the apparent vertical movement due to wave motion or swell.

Preferably the read out from the storage means is controlled by delaying or advancing the read out of the second signals in accordance with the control signal.

Conveniently the means for deriving the control signal from the first and associated second signals comprises means for producing an analogue signal corresponding to the variation of the position of the surface of the sea bed, and filter means arranged to respond to the part of the analogue signal corresponding wave motion or swell.

The filter means may comprise a filter having a pass band in the range 0.05 Hz to 10.0 Hz.

The signal storage means may comprise a plurality of memory devices arranged to be utilized in a predetermined sequence for the storing and reading out of the trains of second signals.

Preferably the signal storage means comprises two memory devices arranged to be utilized alternately for the storing and reading out of the trains of second signals.

The seismic survey apparatus may include counting means arranged to provide the second signals in digital form and to present the digital signals to the signal storage means for storage in digital form. The apparatus may then include a digital to analogue converter to which at least part of the digital signals provided by the counting means are applied and which is arranged to provide an analogue signal from which the control signal is derived. The counting means may comprise one or more binary counters.

The seismic survey apparatus may also include means for producing a visual recording from the read out from the signal storage means, and may further include electro-mechanical transducers from which the first and second signals are derived.

An embodiment of the invention will now be described, by way of example, with reference to the accompanying drawings.

BEST MODE FOR CARRYING OUT THE INVENTION

Figure 1:
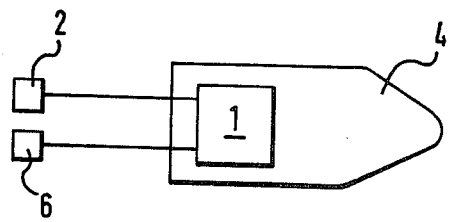
FIG. 1 is a schematic plan view of a marine vessel incorporating seismic survey apparatus in accordance with the invention.
Figure 2:
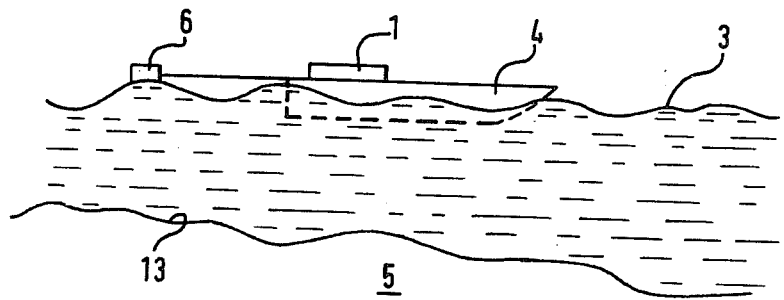
FIG. 2 is a side elevation of the marine vessel shown in FIG. 1.

Referring in the first instance to FIGS. 1 and 2, the seismic survey apparatus 1 comprises an electromechanical transducer 2 arranged to float on the surface of the sea 3 and towed by a line extending from the stern of a marine vessel 4 towards the port side. The electromechanical transducer 2 is arranged to transmit pulses of sound waves towards the sea bed 5 at a pulse repetition rate typically in the range two to eight pulses per second, the sound waves having a frequency of substantially 1 KHz. A further electro-mechanical transducer 6, also arranged to float on the surface of the sea 4 and towed by a line extending from the stern of the vessel 4 towards the starboard side, is arranged to receive pulses of sound waves reflected from the sea bed 5.

Figure 3:
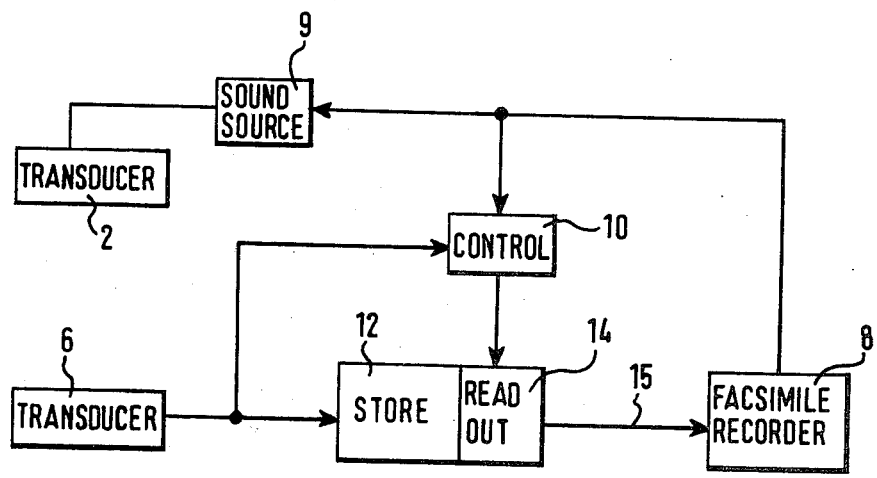
FIG. 3 is a block schematic circuit diagram of the seismic survey apparatus shown in FIGS. 1 and 2.

As will be appreciated from the block schematic diagram shown in FIG. 3, electrical signals generated by a fascimile recorder 8 at the start of each recording cycle, i.e. each time the stylus is at the left hand edge of the recording paper, are arranged to trigger a sound source 9 so that it passes pulses of sound waves to the electro-mechanical transducer 2. The signals generated by the facsimile recorder 8 and utilized to trigger the sound source 9 are also passed to a control signal generator 10. The pulses of sound waves reflected from the sea bed 5 are received by the electro-mechanical transducer 6 which passes electrical signals to a signal storage arrangement 12 which stores each such signal.

The control signal generator 10 which receives the signals from the facsimile recorder 8 indicative of the time that a sound wave is transmitted towards the sea bed 5 by the transducer 2 and also receives signals indicative of the time that a sound wave reflected from the sea bed 5 is received by the transducer 6, is arranged to derive therefrom a control signal which is indicative of the apparent vertical movement of the surface 13 of the sea bed 5 due to the wave motion or swell which causes the electro-mechanical transducers 2 and 6 to rise and fall. Typically, the rise and fall of the transducers 2 and 6 in an around coastal waters would be between one and four meters. The control signal from the signal generator 10, is produced and applied to a read out circuit 14 in a manner described in detail below, to control the read out from the signal storage arrangement 10 to compensate for the apparent rise and fall of the sea bed 5 which is caused by wave motion or swell. The read out signal, when thus compensated, is passed by way of an output lead 15 to the facsimile recorder 8 which produces a visual record of the transmitted and reflected signals.

Figure 4:
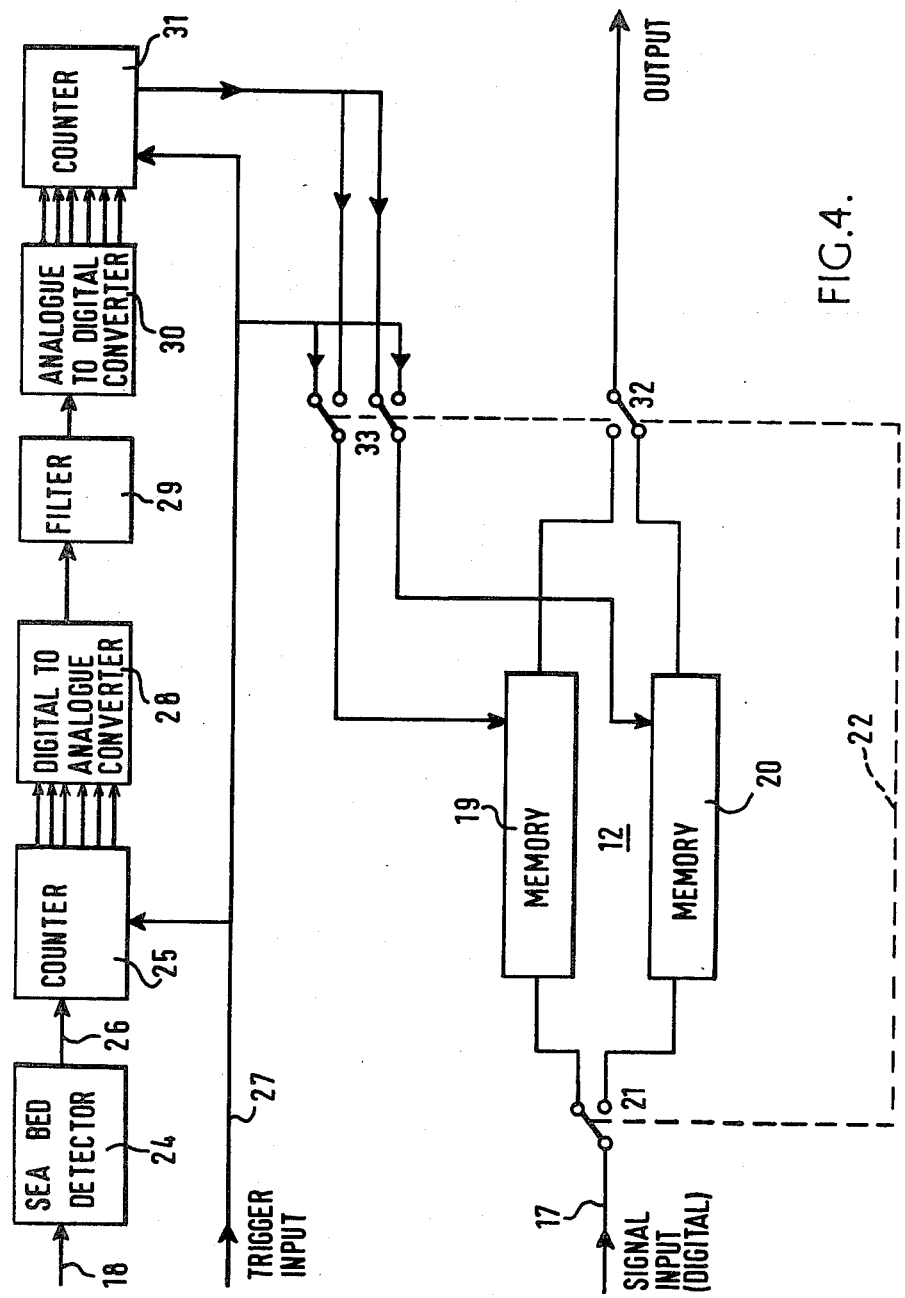
FIG. 4 is a more detailed block schematic circuit diagram of the storage, control and read out circuits shown in FIG. 3.

Turning next to FIG. 4, the signal storage arrangement 12 comprises two memories 19 and 20 in which the electrical signals from the electro-mechanical transducer 6 are stored in digital form. The trains of signals from the transducer 6, each of which is associated which a particular sound wave signal transmitted by the transducer 2, are in an analogue form and converted to digital signals in an analogue to digital converter to be described later, and the trains of digital signals are applied by way of an input lead 17 to the two memories 19 and 20 alternately. Control of the access to the signal storage arrangement 12 is provided by a switching arrangement 21 in response to timing signals applied to an input lead 22, so that digital signals are being written into one memory 19 while stored digital signals are being read out from the other memory 20, and vice versa.

The trains of analogue signals received from the transducer 6 on input lead 18 are also applied to a sea bed detector 24 arranged to respond to the part of the analogue signal indicative of the time that the first sound wave is reflected from the sea bed 5 and to apply a signal to a counter 25 by way of an input lead 26. The counter 25 is triggered by a timing signal applied to a further input lead 27 at the time that the initial sound wave is transmitted towards the sea bed 5 by the transducer 2. The counter 25 therefore produces a count which is indicative of the apparent depth of the sea bed 5 and which is passed to a digital to analogue converter 28 arranged to produce an analogue signal indicative the apparent depth of the surface 13 of the sea bed 5.

The output signal from the digital to analogue converter 28 is applied to a filter 29 arranged to pass signals in the frequency range 0.05 Hz to 10.0 Hz which corresponds to the expected frequency range of the wave motion or swell. In practice the frequency range of the pass band may be 0.05 Hz to 100.0 Hz and the lower cut-off point may be variable from 0.05 Hz to 0.5 Hz. The filter 29 is arranged to apply an output signal to an analogue to digital converter 30 arranged to provide a digital signal corresponding to the output of the filter 29. The digital signal from the analogue to digital converter 30 is applied to a counter 31 arranged to delay the read out from memories 19 and 20 by an amount depending the vertical movement due to wave motion or swell. The read outs from the memories 19 and 20 are passed to the facsimile recorder 8 (not shown in FIG. 4) alternately by way of output lead 15 and a switching arrangement 32 under the control of the timing signals applied to the input lead 22. A further switching arrangement 33, also under the control of the timing signals applied to the input lead 22, controls the start of the reading and writing operations.

Figure 5:
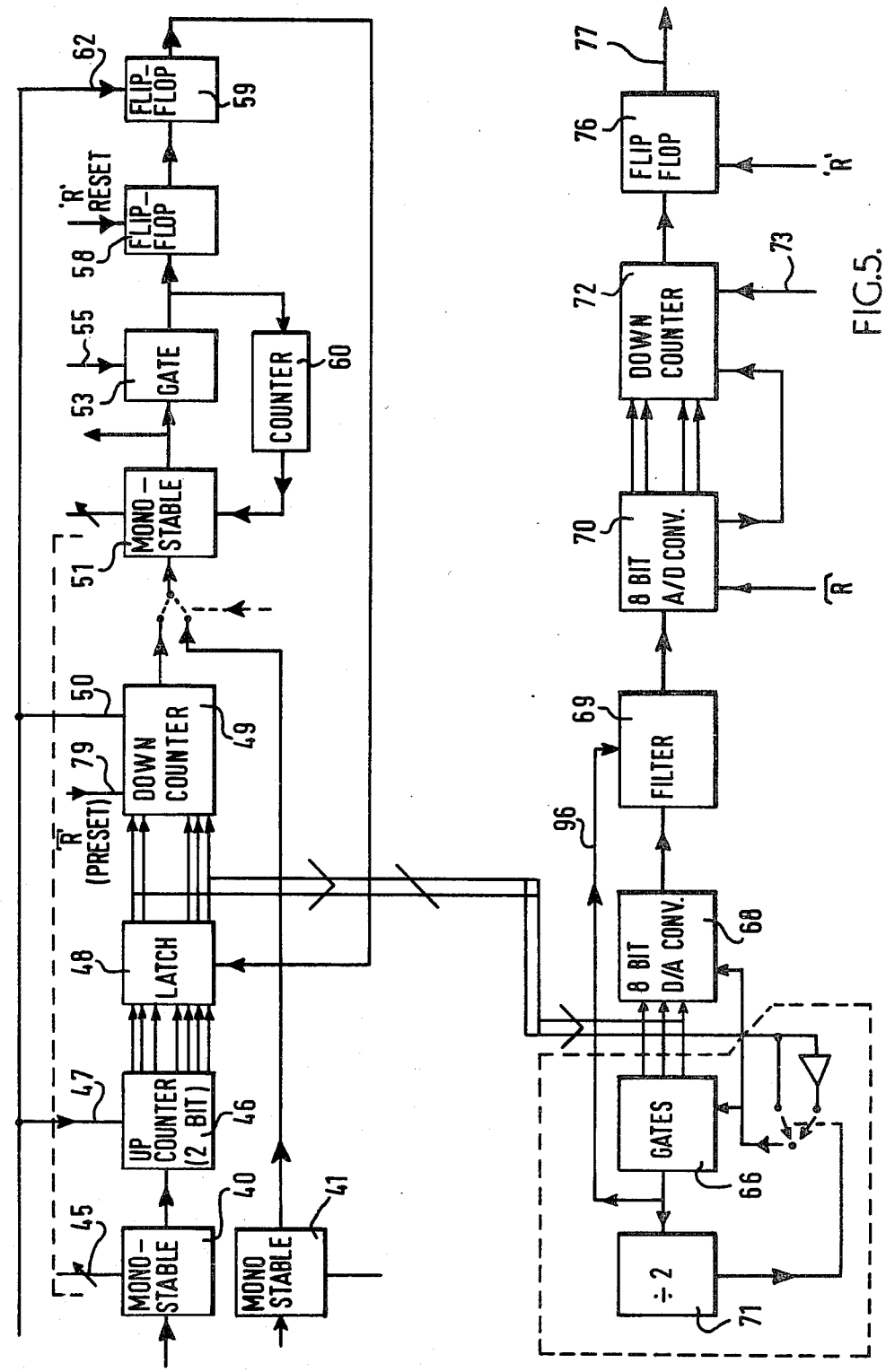
FIG. 5 is a more detailed block schematic circuit diagram of the control and timing arrangements shown in FIG. 4.
Figure 6:
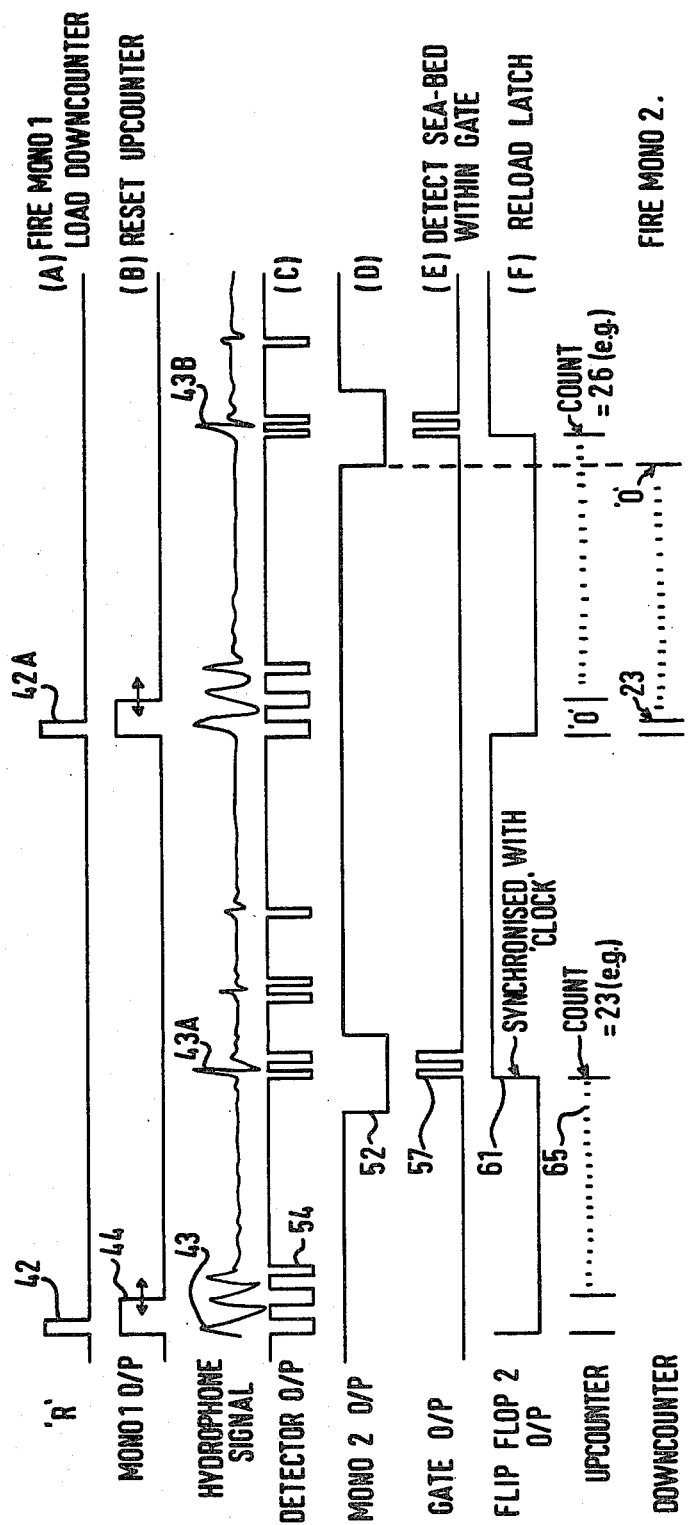
FIG. 6 shows various wave forms relating to the control and timing arrangements of FIG. 5.

Referring now to FIGS. 5 and 6, the control and timing arrangements comprise two monostable devices 40 and 41 which are triggered by a rectangular pulse 42 generated at the instant that the sound wave 43 is transmitted towards the sea bed 5 by the transducer 2. The monostable device 40 provides an output pulse 44 the duration of which can be set by a manual control 45 and which is arranged to start a binary up counter 46 fed with clock pulses on an input lead 47. The output signals 65 from the binary up counter 46 are passed by way of a latch circuit 48 to a resettable binary down counter 49 also supplied with clock pulses on an input lead 50. An output signal from the binary down counter 49 which is generated when the count reaches zero is applied to a monostable device 51 arranged to provide an output signal 52 which is applied to a gate circuit 53.

The gate circuit 53 also receives input signals 54 on an input lead 55 from a sea bed detector (not shown) arranged to respond to signals which exceed a threshold level of background noise, such as noise from the engines of the propeller of the vessel 4 towing the transducers 2 and 6, and which correspond to the sound waves generated by the transducer 2 and the sound waves reflected from the sea bed 5 and received by the transducer 6. The gate circuit 53 applies an output signal 57 to a flip flop 58 which is set by the signal indicative of the first sound wave reflected from the sea bed 5. A further flip flop 59, to which the output signal of flip flop 58 is applied, synchronises the output signal of flip flop 58 to the clock pulses received on input lead 62 so that it does not coincide with a transition of the clock pulses. The gate circuit 53 also applies an output signal to the monostable device 51 by way of a binary counter 60. The output signal from the flip flop 59 is fed back to the latch circuit 48 to cause the latch circuit to be loaded with the new count corresponding to the depth of the surface 13 of the sea bed 5.

The output signals 65 from the binary up counter 46 are also fed by way of the latch circuit 48 to a plurality of gates 66 and also to the digital to analogue converter 68 which provides the analogue signal indicative of the first sound wave reflected from the sea bed 5 and therefore indicative of the apparent depth of the surface 13 of the sea bed 5. The output signal from the gates 66 are applied to a divider 71 and as an inhibit signal to a filter 69. The analogue signal from the digital to analogue converter 68 is fed to the filter 69 which is arranged to pass signals in the frequency range 0.05 Hz to 10.0 Hz which correspond to the frequency range of the wave motion or swell.

The output signal from the filter 69 is passed to an analogue to digital converter 70 arranged to pass output signals 75 to a resettable binary down counter 72 which is also fed with clock pulses by way of an input lead 73. An output signal from the binary down counter 72 which is generated when the count reaches zero is applied to a flip flop 76 which produces an output signal on an output lead 77. The output signal on the output lead 77 is arranged to delay or advance the read out from the memories 19 and 20 (FIG. 4) forming the signal storage arrangement 10 in a manner explained below.

Figure 7:
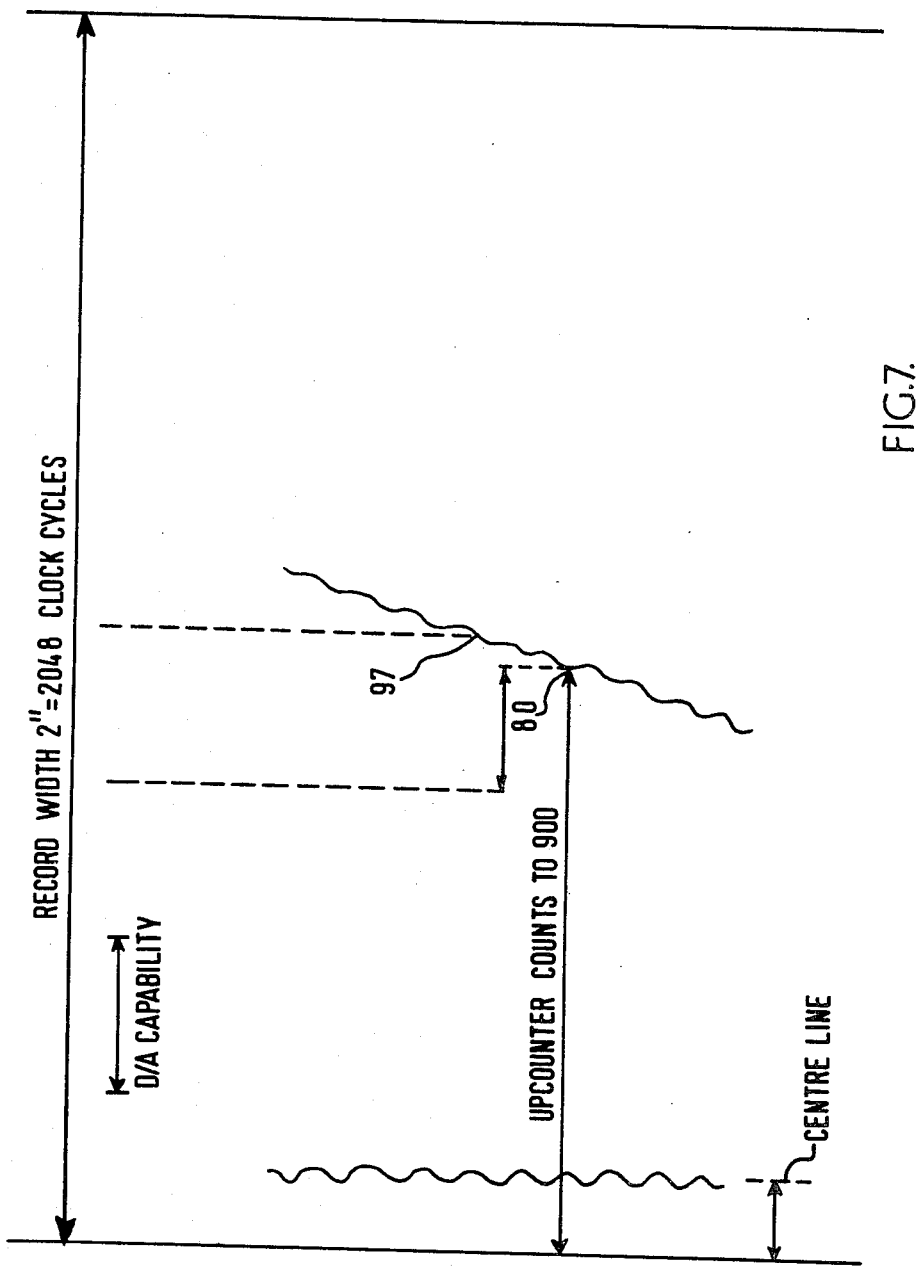
FIG. 7 illustrates the counts performed by the binary up counter shown in FIG. 6.

Referring now to FIG. 7 also, when the monostable device 40 is triggered by the pulse 42 it provides an output pulse 44 the duration of which is dependent on the setting of the manual control 45. The trailing edge of the pulse 44 causes the binary up counter 46 to start counting from zero towards a total of 2048 which corresponds to the maximum range of the record provided by the facsimile recorder 8. The pulse 42 is also applied to an input lead 79 of the binary counter 49 which has a capacity of 2048 but which commences to count down immediately towards zero from a preset total corresponding to the estimated of the depth of the surface 13 of sea bed 5. The count reached by the up counter 46 when the first reflected wave 43A is received by the transducer 6, and in FIG. 6, is assumed to have reached 23, is held by the latch circuit 48.

When the count of the binary down counter 49 has reached zero a negative going signal 52 is applied by the monostable device 51 to the gate circuit 53. Therefore receipt by the gate circuit 55 on its input lead 55 of a signal 54 indicative of the receipt by the transducer 6 of the first reflected signal 43A from the surface 13 of the sea bed 5 causes the gate circuit 53 to produce an output signal 57 and the flip flop 59 to apply a signal to latch circuit 48. The count (assumed to be 23) held by the latch circuit 48 is then passed to the binary down counter 49, the digital to analogue converter 68 and the gates 66. If no sufficient signal on the lead 55 is received while the gate 53 has been opened by the monostable circuit 51, the duration of the output signal 52 from the monostable circuit 51 is increased by the counter 60.

When the next pulse 42A is applied to the monostable device 40, the leading edge of the pulse 44 resets the binary up counter 46 to zero and the trailing edge of the pulse 44 causes the counter 46 to start counting from zero towards a total of 2048. The pulse 42A is also applied to the input lead 79 of the binary down counter 49 which commences to count down immediately towards zero from the preset total of 23 previously passed thereto by the latch circuit 48. The count reached by the up counter 46 when the reflected wave 43B is received by the transducer 6 and which is now 26 as can be seen from FIG. 6 is held by the latch circuit 48.

In the meantime the count down of the down counter 49 will have reached zero so that a negative going signal 52 will have been applied by monostable device 51 to the gate circuit 53. Therefore receipt by the gate circuit 55 of a signal indicative of the receipt by the transducer 6 of the reflected signal 43B from the surface 13 of the sea bed 6 causes the gate circuit 53 to produce an output signal 57 and consequently causes the flip flop 59 to apply a signal to the latch circuit 48. The count, which is held by the latch circuit 48 and which now amounts to 26, is then passed to the binary down counter 49, the digital to analogue converter 68 and the gates 66.

The capacity of the analogue to digital converter 68, to which the count from the latch circuit 48 is applied, is such as to cater for a maximum count of 256, and if the count is within this range, for example, a count of 132 as illustrated at point 80 in FIG. 7, an analogue signal indicative of the count is passed to the filter 69. As the analogue signal varies with time, as it must do if there is a significant swell or wave motion or if the surface 13 of the sea bed 5 slopes upwards or downwards, the filter 69 passes to the analogue to digital converter 70 that part of the analogue signal which corresponds to swell or wave motion. The analogue to digital converter 70 then passes binary output signals to the flip flop 76 which provides the signals on the output lead 77 to delay or advance the read out from the memories 19 and 20 to compensate for the wave motion or swell.

Figure 8:
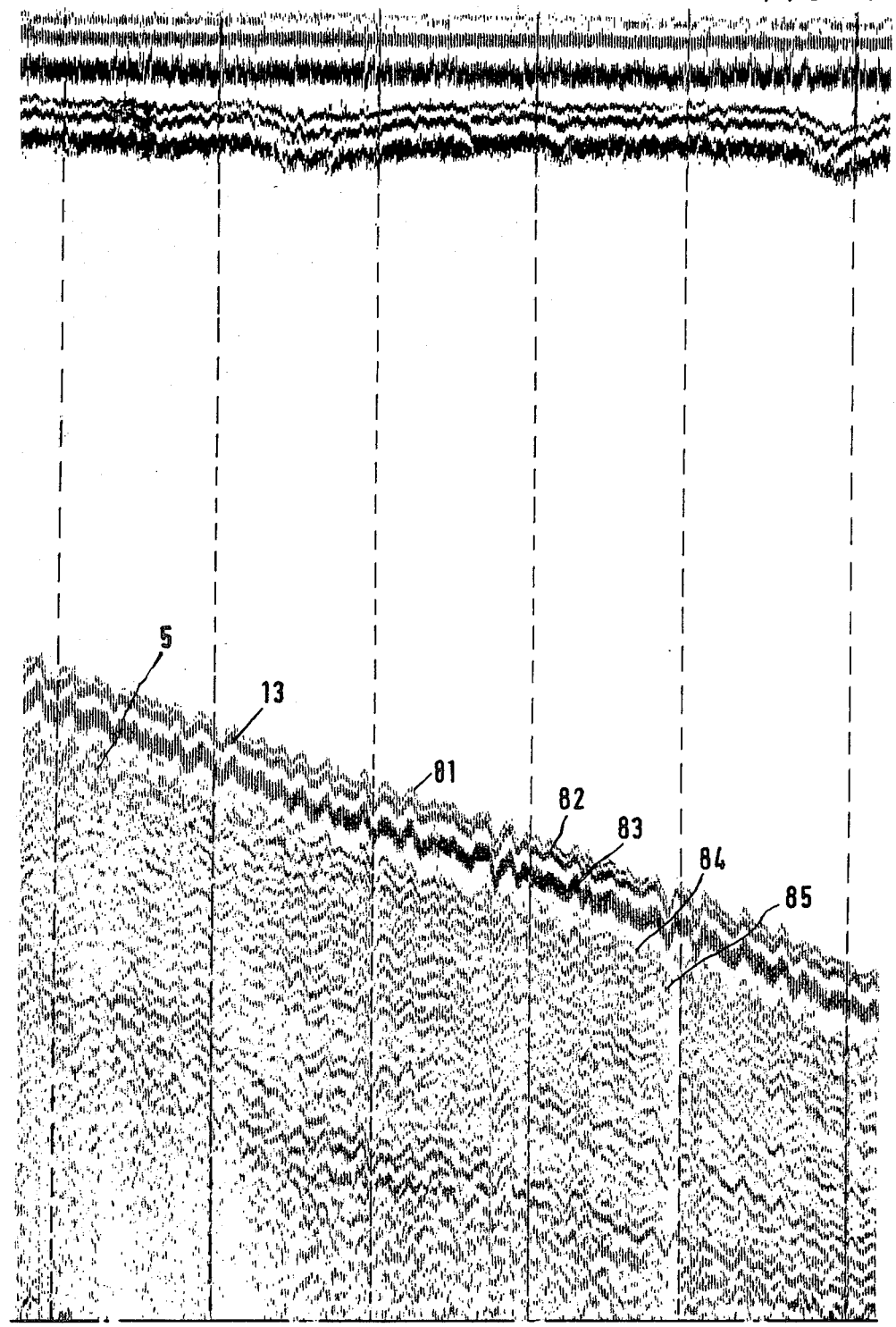
FIG. 8 shows a typical visual recording produced by a pen of a facsimile recorder in response to signals from prior art seismic survey apparatus.
Figure 9:
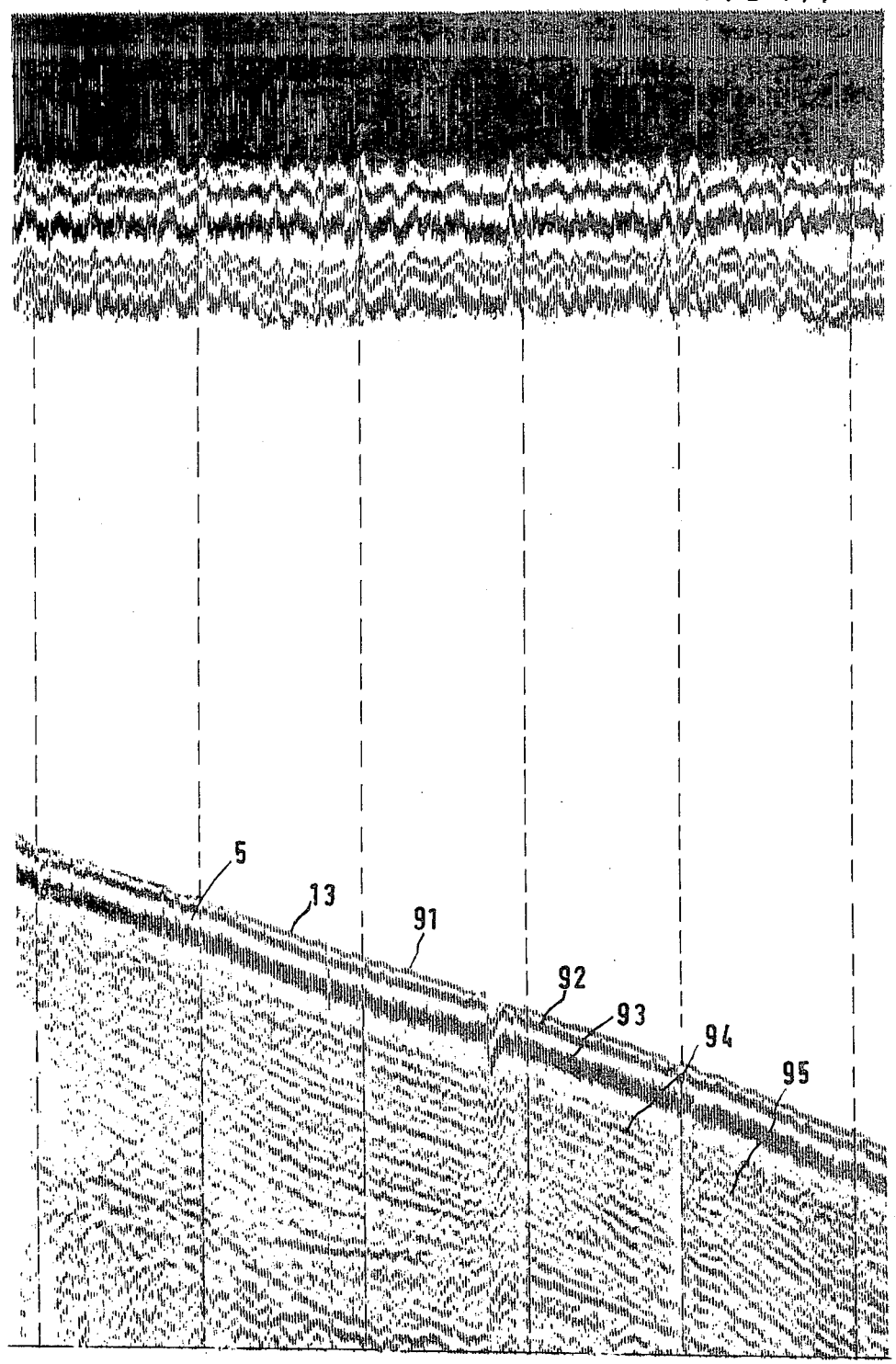
FIG. 9 shows a visual recording similar to FIG. 8, but produced by a pen of a facsimile recorder in response to signals from seismic survey apparatus in accordance with the invention.

The significance of this compensation can be appreciated from inspection of FIGS. 8 and 9 which are, respectively a recording produced by a pen of a facsimile recorder using prior art seismic survey apparatus and a similar recording produced using the seismic survey apparatus of the invention. As can be seen in FIG. 8 the marks or traces 81 which extend from left to right of the recording and represent the surface 13 of the sea bed 5, and the other marks or traces such as 82, 83, 84 and 85, which represent strata of the sea bed, have an undulating shape which is due to swell or wave motion and is a false representation. The undulating marks make evaluation of the recording extremely difficult.

In contrast to this the marks or traces 91 in FIG. 9 which represent the surface 13 of the sea bed 5, and the other marks or traces such as 92, 93, 94 and 95 which represent strata of the sea bed, do not have these undulations, and therefore evaluation of the recording is much easier.

If the count from the latch circuit 48 which is applied to the digital to analogue converter 68 approaches the maximum 256 or zero, as indicated by the point 97 in FIG. 7, then the gates 66 cause the filter 69 to be momentarily inhibited. The digital to analogue converter 68 is then offset by an amount corresponding to half its maximum count, i.e. by 128 in the example given, and the inhibit input is then removed from the filter 69 which then resumes operation.

What I claim is:

1. Seismic survey apparatus comprising:

(a) means for providing a train of first signals each indicative of the time that a sound wave is transmitted towards the sea bed;
(b) means for providing associated trains of second signals indicative of the time that a sound wave reflected from the sea bed is received;
(c) signal storage means for storing the trains of second signals;
(d) means for deriving from the first and associated second signals a control signal indicative of the apparent vertical movement of the surface of the sea bed due to wave motion or swell; and
(e) means for controlling a read out from the signal storage means in accordance with the control signal to compensate for the apparent vertical movement of the sea bed due to wave motion or swell.

2. Seismic survey apparatus as claimed in claim 1, wherein the read out from the signal storage means is controlled by delaying or advancing the read out of the second signals in accordance with the control signal.

3. Seismic survey apparatus as claimed in claim 1, wherein the means for deriving the control signal from the first and associated second signals comprises means for producing an analogue signal corresponding to the variation of the position of the surface of the sea bed, and filter means arranged to respond to the part of the analogue signal corresponding wave motion or swell.

4. Seismic survey apparatus as claimed in claim 3, wherein the filter means comprises a filter having a pass band in the range 0.05 Hz to 10.0 Hz.

5. Seismic survey apparatus as claimed in claim 1, wherein the signal storage means comprises a plurality of memory devices arranged to be utilized in a predetermined sequence for the storing and reading out of the trains of second signals.

6. Seismic survey apparatus as claimed in claim 1, wherein the signal storage means comprises two memory devices arranged to be utilized alternately for the storing and reading out of the trains of second signals.

7. Seismic survey apparatus as claimed in claim 1, comprising counting means arranged to provide the second signals in digital form and to present the digital signals to the signal storage means for storage in digital form.

8. Seismic survey apparatus as claimed in claim 7, comprising a digital to analogue converter to which at least part of the digital signals provided by the counting means are applied and which is arranged to provide an analogue signal from which the control signal is derived.

9. Seismic survey apparatus as claimed in claim 7, wherein the counting means comprises one or more binary counters.

10. Seismic survey apparatus as claimed in claim 1, wherein the train of first signals has a repetition rate of from two to eight bursts per second.

11. Seismic survey apparatus as claimed in claim 1, including means for producing a visual recording from the read out from the signal storage means.

12. Seismic survey apparatus as claimed in claim 1, including electromechanical transducers from which the first and second signals are derived.

* * * * *